3,140,317
NITROFORM-HYDRAZINE COORDINATION
COMPOUNDS
Kenneth O. Groves, Midland, Mich., assignor to The Dow
Chemical Company, Midland, Mich., a corporation of
Delaware
No Drawing. Filed Mar. 3, 1961, Ser. No. 93,263
9 Claims. (Cl. 260—583)

This invention relates to nitroform-hydrazine coordination compounds and a method for their preparation.

Due to the chemical structure of nitroforms, these compounds can advantageously be used as oxidizers in propellants and explosives. The light metal nitroforms, such as lithium nitroform, and magnesium nitroform are particularly useful in propellants. In propellants, a considerable increase in thrust is obtained by use of oxidants which produce a reaction product containing a low molecular driving fluid such as a gas. Thus, the value of a nitroform as an oxidant for propellants can be enhanced by combining the nitroforms with a gas-forming material. A further disadvantage of using a nitroform, such as lithium nitroform or magnesium nitroform, as an oxidant is that the compounds usually are not sufficiently stable to be safely handled and stored a length of time normally required in propellants or explosives.

It is therefore an object of this invention to provide novel compounds which will have an improved stability and produce reaction products of increased gaseous content when used as oxidants in propellants or explosives. A further object is to provide a method for the preparation of the compounds. A still further object is to provide a solid propellant employing metallic fuels and the compounds as an oxidant.

The above and other objects are attained by the novel compounds of the invention which are coordination compounds of hydrazine and an alkali metal or alkaline earth metal nitroform. These compounds are generally solids, have a melting point in the range of 50° C. to 150° C., and usually decompose upon melting. The alkali metal nitroforms combine with 2 moles of hydrazine per mole to form the coordination compound, while the alkaline earth metal nitroforms combine with hydrazine in an equal molar ratio.

The compounds may be prepared by intermixing hydrazine with the particular, nitroform under substantially anhydrous conditions. Generally, it is preferred to carry out the reaction in an inert organic solvent or diluent. The ideal solvent is one in which the nitroform is soluble and in which the nitroform-hydrazine coordination product is not. Illustrative examples of the solvents which may be used are aliphatic alkyl ethers having alkyl radicals containing from 1 to 4 carbon atoms, alicyclic ethers such as tetrahydrofuran, and alkanols having from 2 to 4 carbon atoms. The solvents may be used individually or intermixed. Diethyl ether is the preferred solvent.

Whether a solvent is used or the hydrazine and the nitroform are reacted directly, room temperature is generally employed as a reaction temperature. A higher temperature up to about 70° C. may be used, but no particular advantage is gained. Since the mixture may be explosive, lower temperatures are preferred and temperatures in the range of 70° C. are seldom used. An increase in yield may be realized when the reaction is carried out at lower temperatures, for example at 0° However, the increase in yield is generally not sufficient to warrant the use of the lower temperature.

The ratio of the nitroform and hydrazine used is not critical, since some compound is obtained with any ratio of the reactants. A stoichiometric amount or a slight excess of the nitroform is preferred. The recovery of the nitroform-hydrazine coordination product is usually simplified when stoichiometric amounts of the reactants are used. If an excess of hydrazine is used, the coordination product formed will dissolve in the hydrazine and the product will then have to be separated from the excess hydrazine.

When a coordination compound of lithium nitroform or magnesium nitroform is used as an oxidant in a solid propellant, it may be incorporated with or without other oxidants with metallic fuels, such as aluminum, magnesium, and beryllium and mixtures thereof, by various known methods. For example, if the fuel is in powder or particulate form, the product can be just intermixed with the fuel and a binder if necessary used. If the fuel used is in the form of a porous cellular element, the coordination product may be used to fill the voids. The ratio of the coordination product to the fuel used is normally in the ranges used in propellants. A stoichiometric amount or slight excess of the oxidant is generally employed.

To further illustrate the invention, 5.2 grams of lithium nitroform were dissolved at room temperature in about 100 milliliters of anhydrous ethyl ether to form a yellow solution. Anhydrous hydrazine in an amount of 2.1 grams was added dropwise to the solution. Upon the addition of the hydrazine, the solution gradually changed color from yellow to colorless as the amount of hydrazine added approached stoichiometric amount. Upon the addition of the hydrazine, lithium nitroform-hydrazine coordination product precipitated immediately as an orange-yellow solid. The orange-yellow solid product obtained was washed with diethyl ether and dried in vacuum at room temperature.

The $LiC(NO_2)_3 \cdot 2N_2H_4$ had a density of 1.56 gm. per cubic centimeter and a melting point of about 70° C. at which temperature it decomposed.

Analysis of the product indicated that it contained 3.3 weight percent lithium, 5.98 weight percent carbon. This compared to a theoretical analysis of 3.14 percent lithium, 5.43 percent carbon. Infrared analysis showed the presence of the hydrazine molecule.

When lithium nitroform-hydrazine is used as an oxidizer for a solid propellant using aluminum metal as a fuel, a specific impulse of 276 is obtained. Corresponding high specific impulses are obtained with magnesium and beryllium as metallic fuels.

In a manner similar to that described above, 10.8 grams of magnesium nitroform were dissolved in about 100 ml. of diethyl ether. Hydrazine in an amount of 1.1 grams was added dropwise. The magnesium nitroform precipitated immediately and was also orange-yellow in color. After washing with diethyl ether, it was analyzed and found to contain 6.9 weight percent magnesium and 6.4 weight percent carbon, while the theoretical values are 6.8 and 6.74, respectively. Infrared analysis showed the presence of the hydrazine molecule. It decomposed at 88° C. and had a density of 1.68 grams per cubic centimeter. The compound was detonated upon impact of a 2 kg. weight falling 11.7 cm.

The compound contains 53.8 weight percent oxygen which makes it especially useful as an oxidizer in propellants with metallic fuels, such as aluminum, magnesium and beryllium.

In a manner similar to that above, except that ethyl alcohol was used as a diluent, coordination compounds of nitroforms of sodium, calcium, and barium with hydrazine were prepared.

What is claimed is:
1. A compound selected from the group consisting of alkali metal nitroform-hydrazine coordination compounds and alkaline earth metal nitroform-hydrazine coordination compounds.
2. The lithium nitroform-hydrazine coordination compound having a mole ratio of 2 moles of hydrazine per mole of lithium nitroform.
3. The magnesium nitroform-hydrazine coordination compound having a mole ratio of 1 mole of hydrazine per mole of magnesium nitroform.
4. A process for the preparation of a nitroform-hydrazine coordination compound, which comprises intermixing hydrazine with a nitroform selected from the group consisting of alkali metal nitroforms and alkaline earth metal nitroforms under substantially anhydrous conditions to react the nitroform with the hydrazine to obtain the coordination compound, and recovering the coordination compound.
5. A process according to claim 4 wherein the nitroform and the anhydrous hydrazine are intermixed and reacted in an inert organic diluent.
6. A process according to claim 5 wherein the nitroform is lithium nitroform.
7. A process according to claim 6 wherein the diluent is diethyl ether.
8. A process according to claim 5 wherein the nitroform is magnesium nitroform.
9. A process according to claim 8 wherein the diluent is diethyl ether.

References Cited in the file of this patent
UNITED STATES PATENTS

| | | |
|---|---|---|
| 2,141,058 | Ziegler | Dec. 20, 1938 |
| 2,429,883 | Johanason | Oct. 28, 1947 |
| 2,783,138 | Parsons | Feb. 26, 1957 |
| 2,970,898 | Fox | Feb. 7, 1961 |